April 18, 1939.  E. CHRISTENSEN  2,154,418
INSECT EXTERMINATOR
Filed Sept. 28, 1937  2 Sheets-Sheet 1
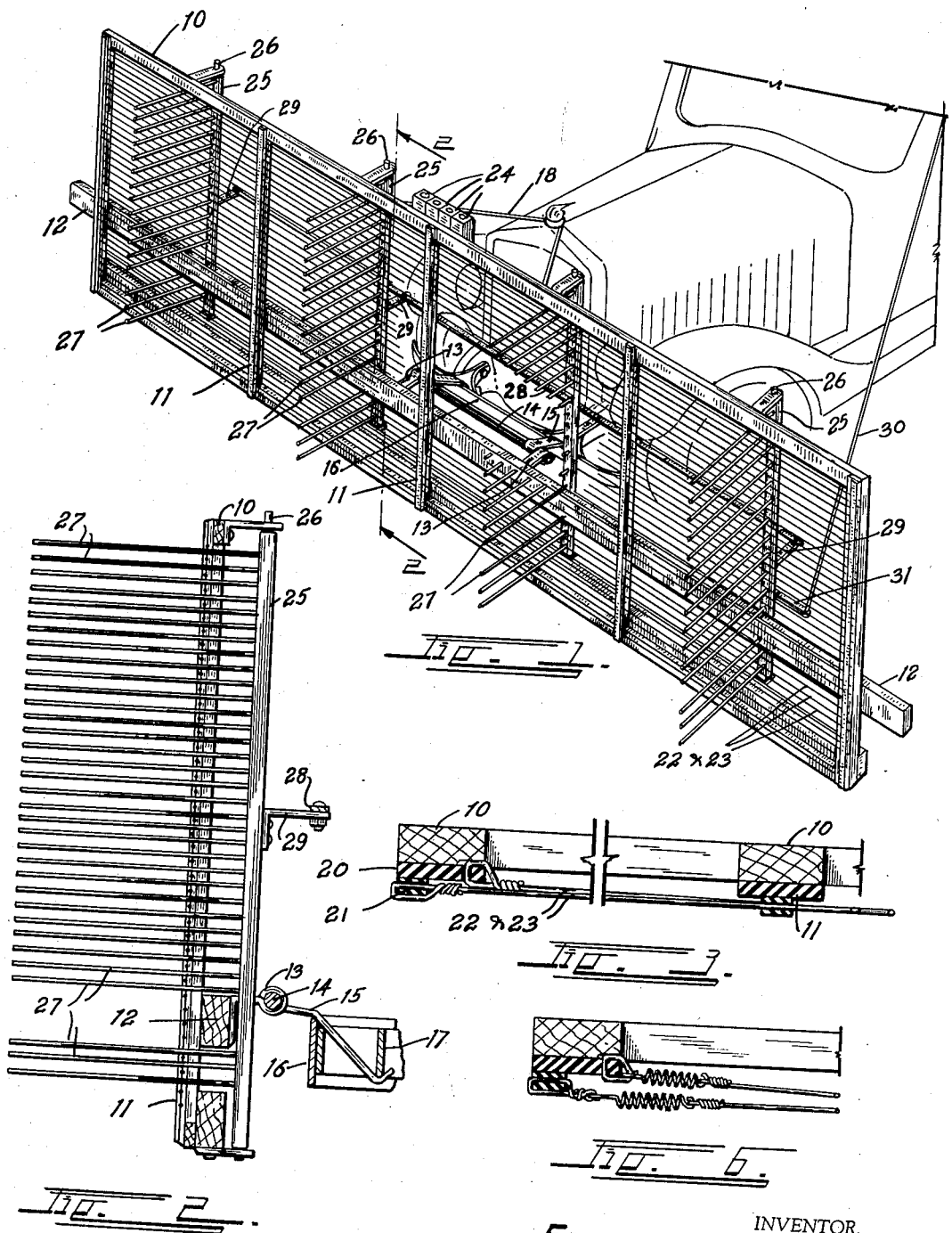
INVENTOR.
ERLING CHRISTENSEN
BY
ATTORNEY.

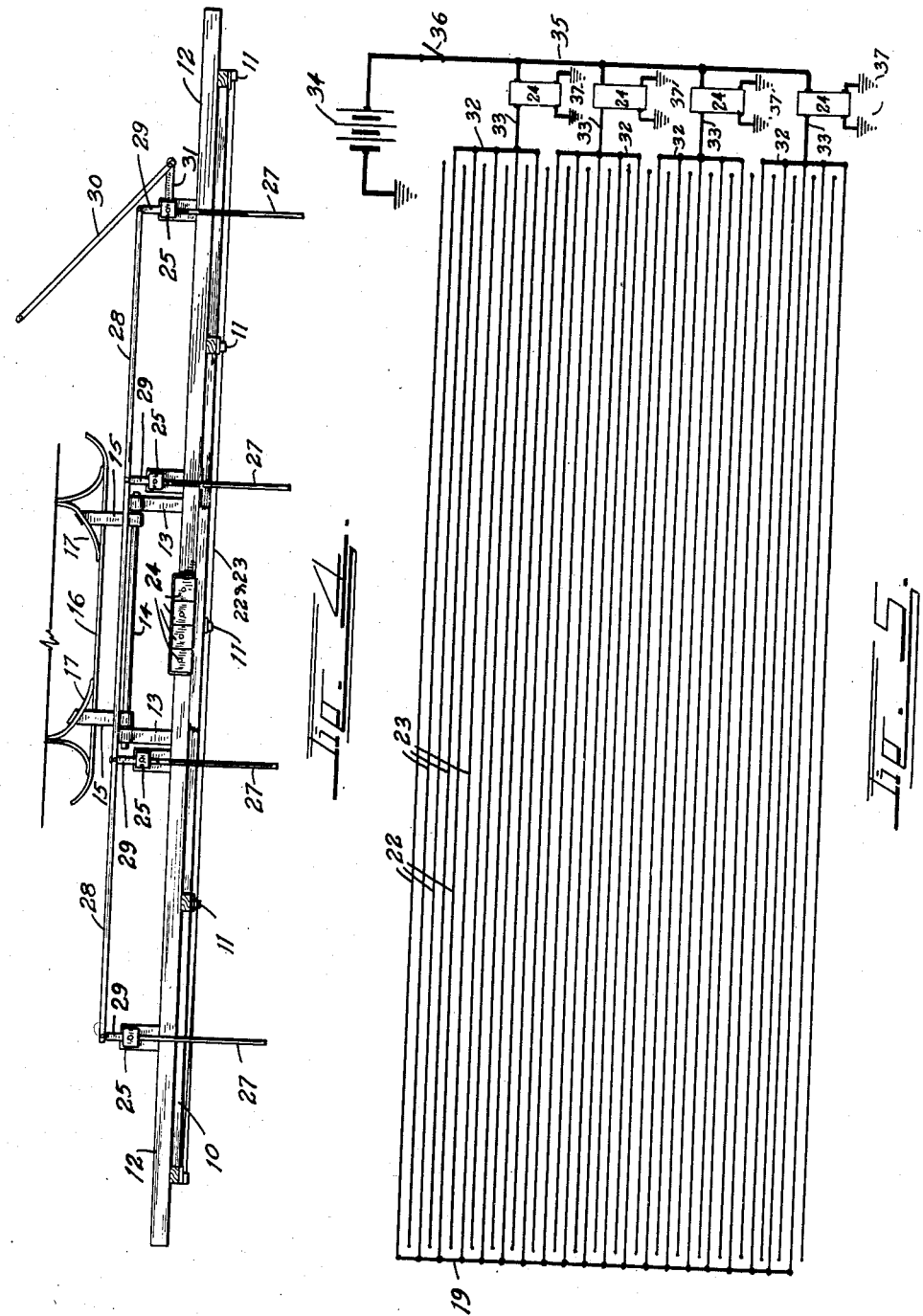

Patented Apr. 18, 1939

2,154,418

UNITED STATES PATENT OFFICE 2,154,418

INSECT EXTERMINATOR

Erling Christensen, Brush, Colo.

Application September 28, 1937, Serial No. 166,062

4 Claims. (Cl. 43—112)

This invention relates to an insect exterminator and is more particularly designed for ridding fields and gardens of grasshoppers.

The principal object of this invention is to provide a lightweight, highly efficient device which can be quickly and easily attached to an automobile, or other vehicle, and driven over the field to electrocute the grasshoppers and other insects therein.

Another object of the invention resides in the particular electric circuit employed which is particularly designed to build up the electric potential and prevent short circuits from destroying the effectiveness of the device.

A further object of the invention is to provide means for continuously cleaning the electrocution screen of the insect bodies while the device is in operation.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view illustrating the invention applied to an automobile.

Fig. 2 is a vertical section therethrough taken on the line 2—2, Fig. 1.

Fig. 3 is a detail horizontal section illustrating the method of attaching the electrocution wires.

Fig. 4 is a plan view of the complete device.

Fig. 5 is a circuit diagram thereof.

Fig. 6 is a detail view illustrating one means for maintaining the frame wires tight.

A typical automobile is indicated at 9 with its front bumper bar at 16 and bumper brace at 17.

The invention employs a frame 10, preferably divided into sections by means of vertical strut members 11. The frame 10 is formed of light wood or similar material and is supported from a horizontal beam 12 which extends beyond the frame to protect it from accidental damage.

A pair of bracket arms 13 extend rearwardly from the beam 12 to support a horizontal bracket bar 14. A pair of bumper hooks 15 are hinged on the bar 14 and extend rearwardly therefrom. These hooks are designed to pass over the front bumper bar 16 of the automobile and hook beneath the bumper brace 17 thereof. This construction allows the frame to be quickly set up and attached to the bumper of an automobile. The upper portion of the frame can be tied to the automobile by means of suitable rope or cable, such as indicated at 18. When through using, the device can be simply lifted from the bumper without the use of tools and without removing bolts or nut attachment devices.

Each vertical strut 11 of the frame carries an insulating facing strip 20 of Bakelite or other suitable insulating material and on the face of each facing strip is a spacing strip 21 of similar material. The spacing strips 21 are drilled with a series of small, spaced-apart holes for receiving a series of horizontal wires 22 and 23, preferably of bare, uninsulated copper.

The wires are supplied with high potential electricity from a series of transformers or spark coils 24 carried by the frame 10.

When the grasshoppers or other insects strike the wires the high voltage current passes between the adjacent wires and through their bodies, immediately electrocuting them. The usual action of the current throws the bodies from the wires. Should large quantities of insects be encountered, however, the bodies may pile and remain attached to the wires. Cleaning sweeps are provided to remove the attached bodies.

These sweeps consist of vertical wooden shafts 25, pivoted at their extremities in pivot brackets 26, there being a sweep for each section of the frame. A series of rods 27 project from each shaft and extend intermediate the wires of the frame. The rods 27 are of a length to allow them to sweep the entire width of the frame section in which they are positioned.

All of the shafts are rotated by means of a connecting rod 28 which connects crank arms 29, there being one arm extending from each of the shafts. Movement is imparted to the extreme shaft through the medium of a cable or rod 30 which extends from a crank arm 31 to a position convenient to the operator.

It is desired to call particular attention to the circuit employed in this device. In the usual electric insect exterminator, the alternate wires are connected to one pole of a source of high voltage electricity, whereas, the intermediate wires are connected to the opposite pole thereof or to the ground, thus making a direct circuit potential across the air gap between the wires. In such a circuit, the wires never reach a potential higher than the regular output of the coils, therefore the maximum potential is limited by the coil.

Another objection to the usual system resides in the fact that a dead insect body or foreign substance short circuiting any two adjacent wires reduces or destroys the efficiency of the entire system.

In the present invention, each alternate wire throughout the entire frame, indicated at 22, is bridged together by means of a tie wire 19, which is completely insulated by the strips 20 and 21, from surrounding conducting material and from the ground.

The intermediate wires 23, are insulated from the wires 22 and from the tie wire 19. They are connected in groups by means of suitable tie wires 32 each of which is connected to one high voltage terminal of one of the transformers 24, as indicated by the conductors 33. The opposite high voltage terminal of each transformer is grounded.

The current to the transformers is fed from the car battery, indicated at 34, through a single wire circuit 35 controlled by a control switch 36. The opposite pole of the low voltage side of the coils is grounded as indicated at 37. Each transformer or coil is provided with an interrupter for creating an intermittent current in the primary of the coil. An ordinary automobile spark coil of the "Model T Ford" type makes an excellent transformer for the purpose.

Such coils are provided with integral condensors for building up the potential until a discharge occurs.

The efficiency of this circuit far exceeds any other circuit which could be devised with this type of coil. In effect it places the secondaries or high voltage windings of any two coils in series with each other with two spark gaps in the series circuit, the latter being connected together by the wires 19 and 22. Such a circuit could be completed between any two of the coils, for instance, let us trace a circuit from the lowermost coil 24 of Fig. 5 to the coil immediately above. Such a circuit would extend from the ground of the lowermost coil, through the coil, through the lower conductor 33, the wires 23, across the first air gap to one of the wires 22, thence through the tie wire 19 to a wire 22 of the group opposite the second coil 24 thence across the second air gap to one of the second group of wires 23 and thence through the second conductor 33 to the secondary of the second coil 24 returning to the ground of the coil. A similar circuit could be traced from any coil to any other coil in the system. The body of a grasshopper striking any wire or pair of wires closes or shortens one air gap of the circuit causing a spark to jump the remaining gap to complete the circuit thus throwing the full potential of two coils and two charged coil condensers into the body of the grasshopper. In the absence of insect bodies the sparks simultaneously and continuously jump between the two air gaps of each circuit between out of phase coils as the potential therein reaches a point to break down the air gap.

Due to the vibrators, the coils are continually changing their phases relative to each other and the discharge will always close a circuit between the pairs of coils which are out of phase with each other at that particular instant. Thus a current is produced which, at all times, has a higher potential than the potential of any single coil and due to the out-of-phase feature, the difference in potential between adjacent wires may exceed the potential of any single condenser discharge. This gives results far in excess of the usual simple high voltage circuit. A short circuit at any point in a group will not interfere with the discharge across the air gaps at all other groups for since the wires 22 are not grounded a short will not ground the system. In fact, it has been found that if the tie wire 19 is grounded, the efficiency of the entire apparatus is so reduced as to render it impractical.

It is essential that the wires be kept tight in order to preserve a uniform spacing between them. This may be accomplished in any desired way such as by means of tension springs 38, as shown in Fig. 6. These springs automatically accommodate any expansion in the wire.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A circuit for insect electrocuting devices comprising: a first series of parallel wires connected together and electrically insulated from all surroundings; and a plurality of groups of wires positioned between the wires of said first series; each of the wires in each group being connected together and each group being independent of each other group; and a transforming coil for each of said groups, one high voltage tap of each coil being connected with one of said groups, the other tap being grounded.

2. An insect exterminator comprising: a frame; a series of parallel wires stretched across said frame, the alternate wires of said series being connected together; a transforming coil; means for connecting the output of said coil to the intermediate wires of said series; vertical shafts positioned adjacent said wires; rods projecting from said shafts intermediate said wires; and means for oscillating said shafts to cause said rods to sweep between said wires, to clear them of adhering material.

3. Means for electrocuting insects comprising: a supporting frame; a first series of parallel wires extending across said frame; a tie wire connecting all wires of the first series together; a second series of wires extending across said frame the wires of the second series being positioned intermediate the wires of the first series; tie wires connecting the wires of the second series into a plurality of independent groups of wires; a plurality of spark coils, one secondary terminal of each coil being connected to one of said groups of wires, the other secondary terminal of each coil being grounded; and means for supplying current to said coils.

4. An electrical insect exterminating device comprising: a vertically positioned frame; a horizontal series of parallel wires stretched across said frame; means for supplying electricity to said wires to electrocute insects thereon; a vertical shaft oscillatably mounted adjacent said wires; a series of parallel rods projecting from said shaft, said rods being spaced to pass between said wires; and means for oscillating said shaft to cause said rods to swing between said wires to remove the insect bodies therefrom.

ERLING CHRISTENSEN.